United States Patent Office 3,468,182
Patented Sept. 23, 1969

3,468,182
COLLAPSIBLE STEERING COLUMN
Shalom Shwartzberg, Ilford, England, assignor to Ford Motor Company, Dearborn, Mich., a corporation of Delaware
Filed Sept. 25, 1967, Ser. No. 670,203
Claims priority, application Great Britain, Mar. 23, 1967, 10,129/67
Int. Cl. B62d 1/16, 1/18
U.S. Cl. 74—492
14 Claims

ABSTRACT OF THE DISCLOSURE

An energy absorbing steering column for a motor vehicle having a corrugated metal strip connecting two steering shaft portions and designed to collapse at a controlled rate under a predetermined load imposed upon the steering wheel.

BACKGROUND OF THE INVENTION

The present invention is particularly concerned with an energy absorbing steering column that is designed to collapse at a controlled rate in order to absorb an impact load upon the steering wheel.

BRIEF SUMMARY OF THE INVENTION

According to the present invention, in a collapsible steering column a steering wheel is mounted on one end of a telescopic column. The column is normally held in its extended position by one or more frangible members which are designed to break to allow telescopic collapse of the column when an axial force above a predetermined value is applied to the column. A corrugated metal strip is incorporated in the column and is deformed by the collapse of the column to absorb energy and thus, regard the collapse of the column.

BRIEF DESCRIPTION OF THE DRAWINGS

The many objects and advantages of the present invention will become apparent upon consideration of the following description and the accompanying drawings, in which.

DETAILED DESCRIPTION OF THE INVENTION

A steering wheel 1 is mounted on one end of a telescopic column.

Figure 1:
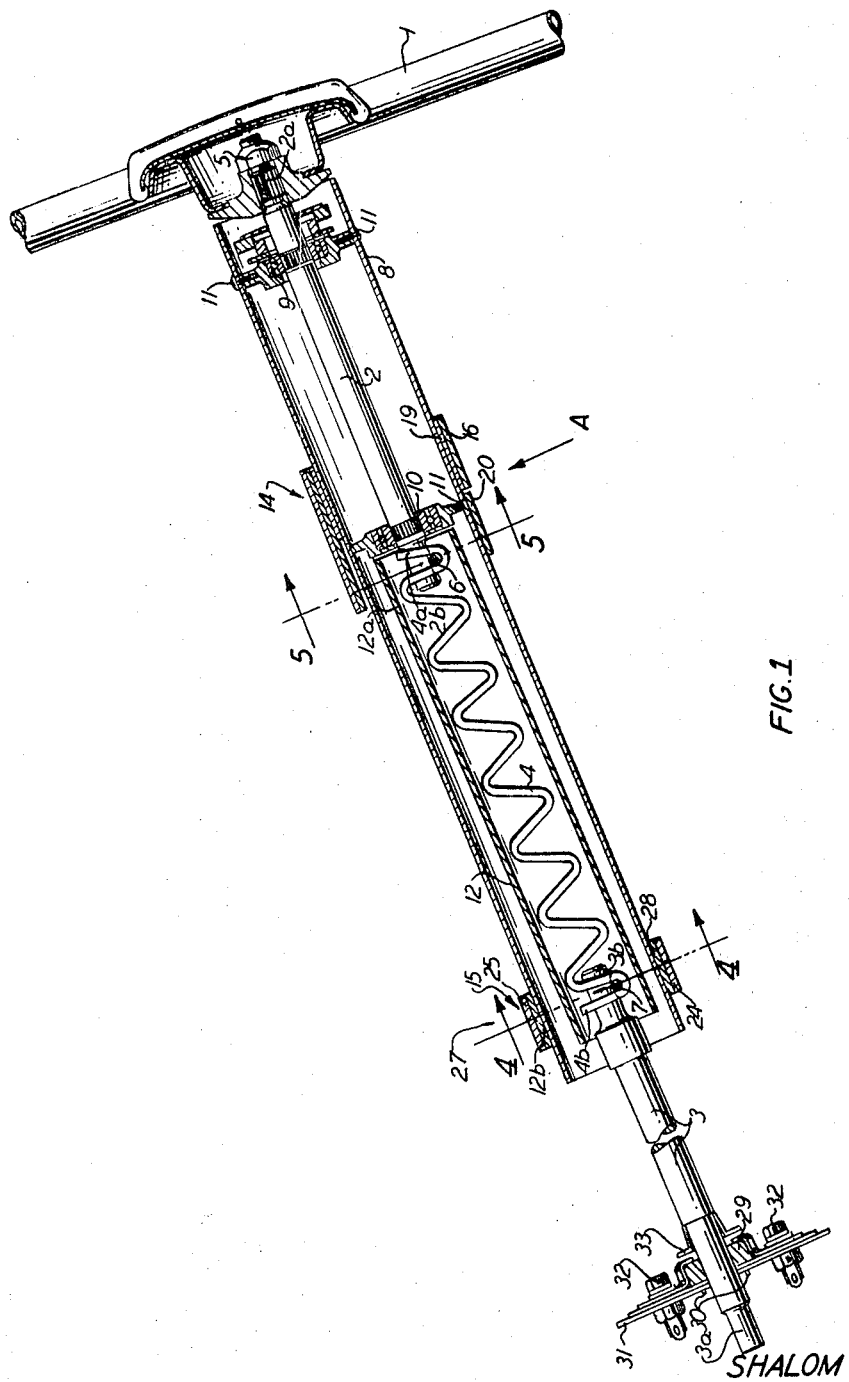
FIG. 1 is a side sectional view of a collapsible steering column constructed in accordance with this invention.

The column comprises a steering shaft having first and second shaft portions 2 and 3, respectively, interconnected by a torque transmitting corrugated strip of metal 4. The metal piece 4 is formed from a flat metal strip that is folded back and forth to form the construction shown in FIG. 1. It is to be noted that the piece 4 is centered so that the axis of the shaft portions 2 and 3 pass through the center of each segment defined between each pair of folds.

The steering wheel 1 is splined to one end 2a of the first shaft portions 2 and held on it by a nut 5. The other end 2b of the first shaft 2 has one end 4a of the corrugated metal strip 4 splined to it. The lower end 3a of the second shaft portion 3 is connected to a steering gear (not shown) and the other end 3b of the second shaft 3 is splined to the other end 4b of the corrugated metal strip.

Figure 4:
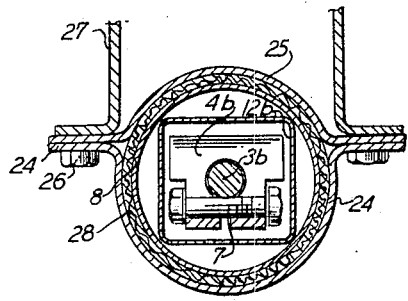
FIG. 4 is a sectional view taken on section lines 4—4 of FIG. 1.
Figure 5:
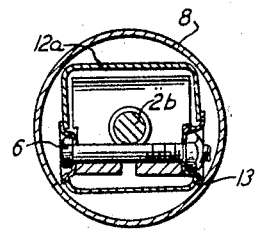
FIG. 5 is a sectional view taken on section lines 5—5 of FIG. 1.
Figure 6:
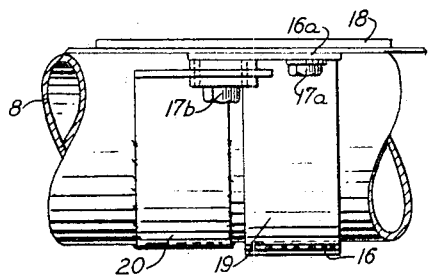
FIG. 6 is a side elevational view of a portion of the steering column shown in FIG. 2.

The ends of the corrugated metal strip 4 are secured to the adjacent ends of the two shafts 2 and 3 against an axial separating force by pinch bolts 6 and 7, respectively, (FIGS. 5 and 4, respectively).

The first shaft 2 is rotatably supported in a tubular metal outer casing 8 by spaced upper and lower bearings 9 and 10. The bearings are secured to the casing 8 by screws 11 so that the steering wheel, first shaft 2, bearings 9 and 10 and the casing 8 form an integrated assembly.

A rectangular sectioned metal tube 12 surrounds the corrugated metal strip 4 and is located coaxially within the outer casing 8. The tube 12 is secured at one end 12a to the end 2b of the shaft 2 and the adjacent end 4a of the strip 4 by the pinch bolt 6 and a clamp 13 (FIG. 5). The other end 12b of the tube 12 is free.

Figure 2:
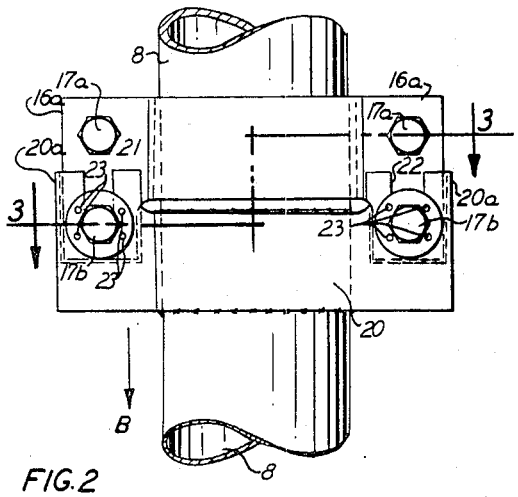
FIG. 2 is a plan view of a portion of the steering column taken in the direction of arrow A in FIG. 1.
Figure 3:
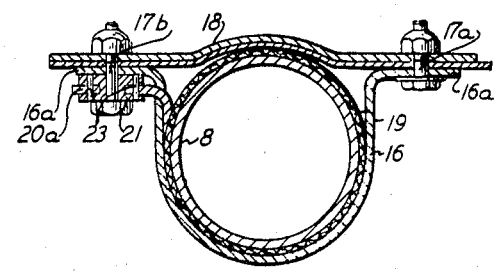
FIG. 3 is a sectional view taken on section lines 3—3 of FIG. 2.

The outer casing 8 is supported in two axially spaced apart supports 14 and 15. FIGS. 2 and 3 show the upper support 14 which consists essentially of a generally omega shaped metal bracket 16 which is secured by bolts 17a and 17b to a fixed part 18 of a motor vehicle body such as the instrument panel. The bracket 16 is lined with a ring of felt 19.

The outer casing 8 has a sheet metal projection 20 that fits around and is welded to the outside of the casing 8.

The bolts 17b pass through plastic or metal bushings 21 located in slots 22 in the feet 20a of the projection 20. Each bushing 21 is secured to the respective foot 20a of the projection 20 by frangible members in the form of light alloy shear pins 23. The pins 23 normally prevent sliding movement of the projection 20 in the direction of the arrow B in FIG. 2.

The second or lower support 15 simply comprises two brackets 24 and 25 that enclose the casing 8 and which are secured by bolts 26 to a fixed part 27 of the vehicle body. The support 15 is also lined with a felt ring 28.

The lower end 3a of the second shaft 3 passes through a bushing 29 and a hole 30 in a bulkhead 31 to which the bushing 29 is secured by bolts 32.

A collar 33 is carried by the lower shaft portion 3 and is adapted to abut against the bushing 29 and act as a stop to provide a reaction point when the column collapses.

OPERATION

In normal operation steering torque is transmitted from the steering wheel 1, through the upper shaft portion 2, corrugated metal strip 4, square tube 12 and lower shaft portion 3 to the steering gear (not shown).

In the event the driver is thrown against the steering wheel 1 with a force above a predetermined value, the impact will cause the pins 23 to shear. The casing 8 will then no longer be secured to the fixed parts 18 of the vehicle body and will be free to move axially toward the bulkhead 31.

The steering wheel 1, upper shaft portion 2, bearings 9 and 10, tube 12 and the casing 8 will thus move as a unit toward the bulkhead 31.

Because the lower shaft 3 is fixed this axial movement of the casing unit will cause the corrugated metal strip 4 to be compressed axially. Any tendency for the strip 4 to buckle radially is inhibited by the relatively close fitting tube 12.

Compression of the strip 4 absorbs energy and thus retards the collapse of the steering column and hence retards the forward motion of the driver.

Any initial axial movement of the lower shaft portion 3 toward the bulkhead 31 will be halted by the collar 33 abutting the bushing 29. The bushing then acts as a reaction point for the compression of the strip 4.

To return the steering column to its original condition, the strip 4 must either be extended or preferably replaced by a new uncompressed corrugated strip.

The casing 8 can also serve to house a turn indicator switch and other equipment commonly mounted on a steering column.

The foregoing description presents the presently preferred embodiment of this invention. Modifications and alterations may occur to those skilled in the art that will come within the scope and spirit of the invention.

I claim:

1. A steering column for a motor vehicle comprising a first steering shaft portion, a second steering shaft portion, a corrugated metal strip having a first end connected to one end of said first shaft portion and a second end connected to one end of said second shaft portion, a steering wheel connected to the other end of said first shaft portion, the other end of said second shaft portion being constructed to be connected to a steering gear, a tube connected to one of said shaft portions and surrounding said metal strip, said tube being constructed to prevent said metal strip from buckling when said first shaft portion is moved toward said second shaft portion.

2. A steering column for a motor vehicle as defined in claim 1 and comprising the axis of said shaft portions extending through the approximate center of the segments formed between the folds in said metal strip.

3. A steering column for a motor vehicle as defined in claim 1 and comprising the axis of said shaft portions extending through the approximate center of the rectangular segments formed between the folds in said metal strip, said tube having a substantially rectangular cross sectional configuration.

4. A steering column for a motor vehicle as defined in claim 1 and comprising a housing rotatably supporting said first shaft portion, stationary support means, frangible means connecting said housing to said support means.

5. A steering column for a motor vehicle as defined in claim 1 and comprising the axis of said shaft portions extending through the approximate center of the rectangular segments formed between the folds in said metal strip, a housing rotatably supporting said first shaft portion, stationary support means, frangible means connecting said housing to said support means, said tube having a substantially rectangular cross sectional configuration.

6. A steering column for a motor vehicle as defined in claim 1 and comprising the axis of said shaft portions extending through the approximate center of the rectangular segments formed between the folds in said metal strip, a housing rotatably supporting said first shaft portion, stationary support means, frangible means connecting said housing to said support means, said tube having a substantially rectangular cross sectional configuration, stop means connected to said second shaft portion and constructed to engage said support means and prevent axial displacement therebetween in at least one direction.

7. A steering column for a motor vehicle comprising a housing, a first steering shaft portion rotatably supported in said housing, a second steering shaft portion coaxially supported with respect to said first shaft portion, an energy absorber comprising a corrugated continuous metal strip having a first end connected to one end of said first shaft portion and a second end connected to one end of said second shaft portion and forming a torque transmitting connection between said portions, a steering wheel connected to the other end of said first shaft portion, the other end of said second shaft portion being constructed to be connected to a steering gear, said corrugated metal strip being formed with a plurality of folds disposed on both sides of the axis of said shaft portions, said strip being constructed to collapse under a predetermined axial load and to suffer plastic deformation at said folds.

8. A steering column for a motor vehicle as defined in claim 7 and comprising a tube surrounding said metal strip, said tube being constructed to prevent said metal strip from buckling when said first shaft portion is moved toward said shaft portion.

9. A steering column for a motor vehicle as defined in claim 7 and comprising stationary support means, frangible means connecting said housing to said support means.

10. A steering column for a motor vehicle as defined in claim 7 and comprising a tube surrounding said metal strip, said tube being constructed to prevent said metal strip from buckling when said first shaft portion is moved toward said shaft portion stationary support means, frangible means connecting said housing to said support means.

11. A steering column for a motor vehicle as defined in claim 7 and comprising a generally rectangular tube connected to one of said shaft portions and surrounding said metal strip, said tube being constructed to prevent said metal strip from buckling when said first shaft portion is moved toward said shaft portion stationary support means, frangible means connecting said housing to said support means, said strip having transverse portions interconnecting said folds, said axis intersecting said transverse portions near their centers.

12. A steering column for a motor vehicle as defined in claim 7 and comprising said strip having transverse portions interconnecting said folds, said axis intersecting said transverse portions near their centers.

13. A steering column for a motor vehicle as defined in claim 12 and comprising a tube connected to one of said shaft portions and surrounding said metal strip, said tube being constructed to prevent said metal strip from buckling when said first shaft portion is moved toward said second shaft portion.

14. A steering column for a motor vehicle as defined in claim 12 and comprising stationary support means, frangible means connecting said housing to said support means.

References Cited

UNITED STATES PATENTS

| | | | |
|---|---|---|---|
| 2,272,900 | 2/1942 | Saurer | 64—11 |
| 2,591,769 | 4/1952 | Beechler | 64—15 |
| 3,262,332 | 7/1966 | Wight | 74—493 |
| 3,392,599 | 7/1968 | White | 74—492 |

MILTON KAUFMAN, Primary Examiner

U.S. Cl. X.R.

180—78; 188—1; 280—87